United States Patent
Sherman

(10) Patent No.: US 10,354,558 B2
(45) Date of Patent: Jul. 16, 2019

(54) SYSTEM AND METHOD FOR TRAINING USE OF PRESSURE EQUALIZATION TUBE DELIVERY INSTRUMENT

(71) Applicant: Tusker Medical, Inc., Menlo Park, CA (US)

(72) Inventor: Nicholas E. Sherman, Menlo Park, CA (US)

(73) Assignee: Tusker Medical, Inc., Menlo Park, CA (US)

( * ) Notice: Subject to any disclaimer, the term of this patent is extended or adjusted under 35 U.S.C. 154(b) by 523 days.

(21) Appl. No.: 14/837,299

(22) Filed: Aug. 27, 2015

(65) Prior Publication Data
US 2017/0061827 A1    Mar. 2, 2017

(51) Int. Cl.
*G09B 23/30* (2006.01)
*G09B 5/02* (2006.01)

(52) U.S. Cl.
CPC .............. *G09B 23/30* (2013.01); *G09B 5/02* (2013.01)

(58) Field of Classification Search
CPC ........ G09B 23/30; G09B 23/285; G09B 9/00; G09B 5/02
USPC ......................................................... 434/270
See application file for complete search history.

(56) References Cited

U.S. PATENT DOCUMENTS

| | | | |
|---|---|---|---|
| 8,052,693 B2 | 11/2011 | Shahoian | |
| 8,192,420 B2 | 6/2012 | Morriss et al. | |
| 8,249,700 B2 | 8/2012 | Clifford et al. | |
| 9,011,363 B2 | 4/2015 | Clopp et al. | |
| 9,548,003 B2* | 1/2017 | Forte ....................... | G09B 23/30 |
| 2008/0050710 A1* | 2/2008 | Cottler ................... | G09B 23/28 434/270 |
| 2010/0198135 A1 | 8/2010 | Morriss et al. | |
| 2010/0248200 A1* | 9/2010 | Ladak .................. | G09B 23/285 434/262 |
| 2011/0015645 A1 | 1/2011 | Liu | |
| 2011/0091856 A1* | 4/2011 | Ruf ........................ | G09B 23/28 434/271 |
| 2013/0230837 A1* | 9/2013 | Meglan .................. | G09B 23/28 434/262 |
| 2014/0199673 A1* | 7/2014 | Jian ......................... | G06F 3/016 434/262 |
| 2014/0276906 A1* | 9/2014 | Andreas ................ | A61F 11/002 606/109 |
| 2015/0242008 A1* | 8/2015 | Beckman ................ | G06F 3/043 345/177 |
| 2017/0140671 A1* | 5/2017 | Chui ....................... | G09B 23/30 |

* cited by examiner

*Primary Examiner* — Samchuan C Yao
*Assistant Examiner* — Lily M Del Valle

(57) ABSTRACT

A set of simulator hardware and software provide a realistic training environment for pressure equalization tube delivery to a tympanic membrane using a semi-automated pressure equalization tube delivery device ("PETDD"). An anatomically realistic ear model is attached to a touch sensitive display so that the ear model aligns with a displayed virtual image of the middle ear, creating a realistic view through the ear canal of the ear model. A training PETDD and other devices of the simulator provide pressure and location data for the training PETDD as a trainee inserts the PETDD tip into the ear canal to rest against the virtual TM and simulate a PE tube delivery event. Resulting data is examined to determine whether the simulated delivery would have been successful if it had been a real scenario.

20 Claims, 14 Drawing Sheets

SYSTEM AND METHOD FOR TRAINING USE OF PRESSURE EQUALIZATION TUBE DELIVERY INSTRUMENT

BACKGROUND

Some children may exhibit recurrent episodes of otitis media and/or -otitis media with effusion. Treatment of severe cases may involve the placement of a pressure equalization tube or tympanostomy tube through the tympanic membrane to provide adequate drainage of the middle ear by providing fluid communication between the middle and outer ear. In particular, such a tube may provide a vent path that promotes drainage of fluid from the middle ear via the Eustachian tube and may thus reduce stress imposed on the tympanic membrane from pressure within the middle ear. This may further reduce the likelihood of future infections and pressure induced ruptures of the tympanic membrane. Pressure equalization tubes may fall out spontaneously within about a year of placement. Exemplary pressure equalization tube delivery systems are disclosed in U.S. Pat. No. 8,052,693, entitled "System and Method for the Simultaneous Automated Bilateral Delivery of Pressure Equalization Tubes," issued Nov. 8, 2011, the disclosure of which is incorporated by reference herein. Additional exemplary pressure equalization tube delivery systems are disclosed in U.S. Pat. No. 8,249,700, entitled "System and Method for the Simultaneous Bilateral Integrated Tympanic Drug Delivery and Guided Treatment of Target Tissues within the Ears," issued Aug. 21, 2012, the disclosure of which is incorporated by reference herein. Still additional exemplary pressure equalization tube delivery systems are disclosed in U.S. Pub. No. 2011/0015645, entitled "Tympanic Membrane Pressure Equalization Tube Delivery System," published Jan. 20, 2011, the disclosure of which is incorporated by reference herein.

Insertion of a pressure equalization tube may be performed using general anesthesia in some cases, which may require additional resources such as an operating room, the presence of an anesthesiologist, and time in a recovery room. Furthermore, the use of general anesthesia may include certain risks that a patient may or may not be comfortable with undertaking. Some pressure equalization tube delivery systems and methods provide a local anesthetic through iontophoresis. Examples of such systems and methods are disclosed in U.S. Pub. No. 2010/0198135, entitled "Systems and Methods for Anesthetizing Ear Tissue," published Aug. 5, 2010, the disclosure of which is incorporated by reference herein. Additional examples of such systems and methods are disclosed in U.S. Pat. No. 8,192,420, entitled "Iontophoresis Methods," issued Jun. 5, 2012, the disclosure of which is incorporated by reference herein.

While use of a tube Delivery system or pressure equalization tube delivery device (PETDD) may reduce the procedure length and need for anesthesia during tube placement procedures when compared to the use of a scalpel and forceps, there are still risks that can be mitigated through training and experience with such devices and procedures.

While a variety of pressure equalization tube delivery training systems and methods have been made and used, it is believed that no one prior to the inventor(s) has made or used an invention as described herein.

BRIEF DESCRIPTION OF THE DRAWINGS

It is believed the present invention will be better understood from the following description of certain examples taken in conjunction with the accompanying drawings, in which like reference numerals identify the same elements and in which.

Figure 1:
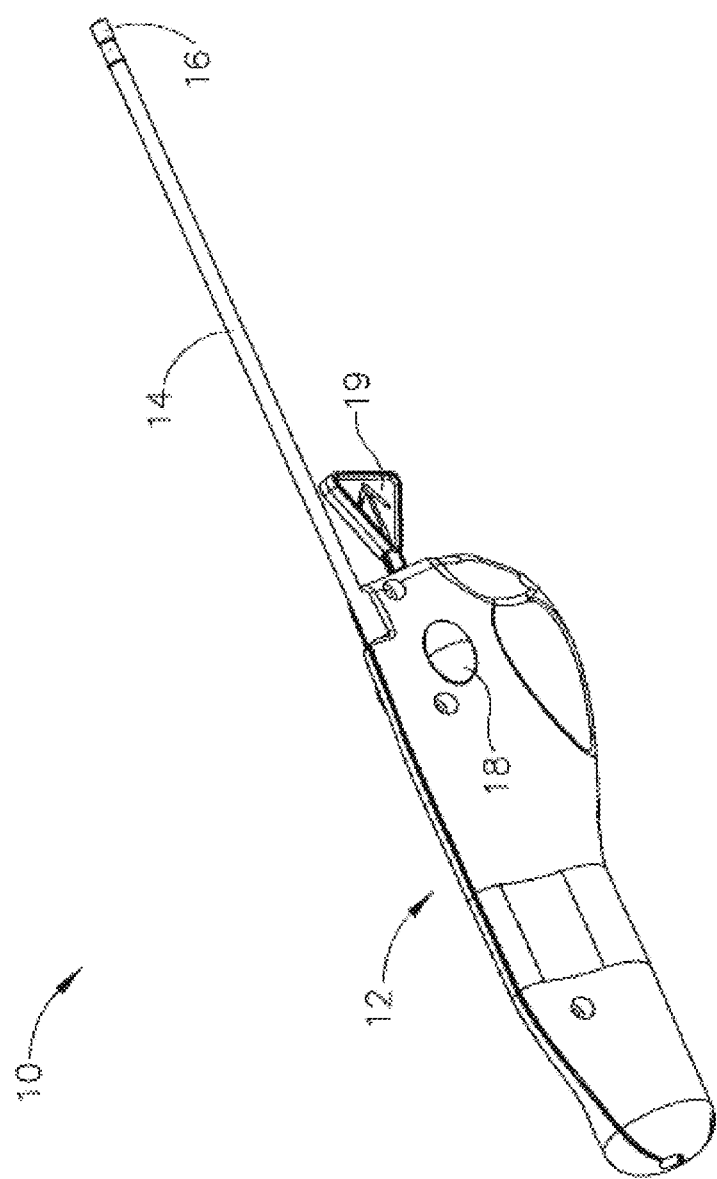
FIG. 1 depicts a perspective view of an exemplary pressure equalization tube delivery device (PETDD)

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Exemplary Pressure Equalization Tube Delivery Device (PETDD)

As noted above, a pressure equalization (PE) tube may be delivered to the tympanic membrane (TM) of a patient as a way of treating, for example, otitis media. In some instances, a delivery instrument may be used to insert PE tubes in the tympanic membrane (TM) without the use of general anesthesia. FIG. 1 shows an exemplary equalization tube delivery device (PETDD) (10) that may be used in such procedures. It should be understood that PETDD (10) may be used with an endoscope to provide visualization of the tympanic membrane (TM) during use of PETDD (10). It should also be understood that a patient may receive local anesthesia at the tympanic membrane (TM) through a process of iontophoresis before PETDD (10) is actuated to deploy a PE tube. Various examples of devices and methods that may be used to provide iontophoresis will be described in greater detail below. It should also be understood that iontophoresis may be provided in accordance with at least some of the teachings of U.S. Pub. No. 2010/0198135, the disclosure of which is incorporated by reference herein; and/or in accordance with at least some of the teachings of U.S. Pat. No. 8,192,420, the disclosure of which is incorporated by reference herein.

As shown in FIG. 1, PETDD (10) of this example includes a handpiece (12) and a cannula (14) extending distally from handpiece (12). Cannula (14) is sized for insertion in a patient's ear canal, such that the tip (16) of cannula may directly engage the patient's tympanic membrane (TM). As soon as the tip (16) achieves apposition with the tympanic membrane (TM), the operator may depress button (18), which may trigger a firing sequence whereby PETDD (10) creates a myringotomy incision, dilates the myringotomy incision, and inserts a PE tube in the myringotomy incision nearly instantly. A pin (19) selectively locks button (18) to avoid premature firing of PETDD (10), such that the operator must remove pin (19) before intentionally firing PETDD (10).

By way of example only, PETDD (10) may be constructed and operable in accordance with at least some of the teachings of U.S. Pat. No. 8,052,693, the disclosure of which is incorporated by reference herein; U.S. Pat. No. 8,249,700, the disclosure of which is incorporated by reference herein; U.S. Pub. No. 2011/0015645, the disclosure of which is incorporated by reference herein; and/or U.S. Pub. No. 2014/0276906, entitled "Features to Improve and Sense Tympanic Membrane Apposition by Tympanostomy Tube Delivery Instrument," filed on even date herewith, the disclosure of which is incorporated by reference herein. Other suitable forms that PETDD (10) may take will be apparent to those of ordinary skill in the art in view of the teachings herein. It should also be understood that a PE tube may be inserted in a tympanic membrane (TM) manually, such as by creating the myringotomy incision with a knife and inserting the PE tube using forceps, etc.

Figure 2:
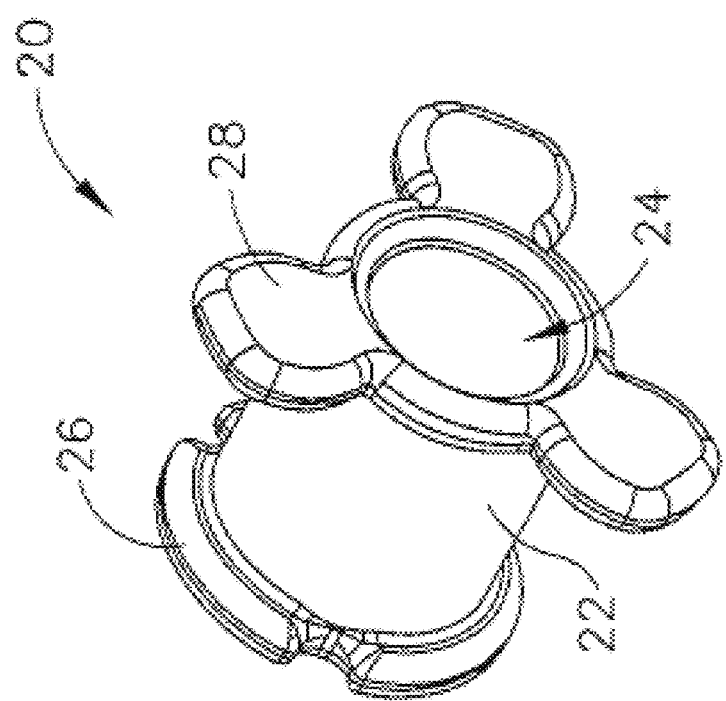
FIG. 2 depicts a perspective view of an exemplary pressure equalization (PE) tube suitable for delivery by the PETDD of FIG. 1.
Figure 3:
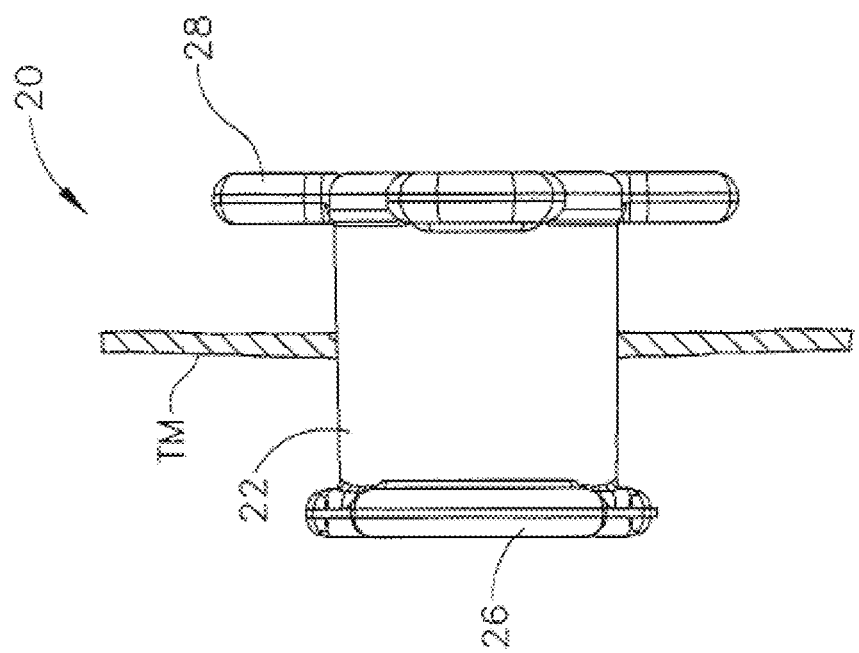
FIG. 3 depicts a side elevation view of the PE tube of FIG. 2, positioned within a tympanic membrane.

FIGS. 2-3 show an exemplary PE tube (20) that may be delivered to the tympanic membrane (TM) using PETDD (10). PE tube (20) of this example comprises a cylindraceous body (22) that defines a passageway (24). A flange (26) is located at one end of body (22) while a set of petals (28) are located at the other end of body (22). PE tube (20) is formed of a resilient material that is biased to assume the rivet like configuration shown in FIGS. 2-3. However, flange (26) and petals (28) may be flexed inwardly toward the longitudinal axis of body (22) to provide PE tube (20) with a cylindraceous configuration. In particular, flange (26) and petals (28) may be flexed such that their outer surfaces are at the same radial distance from the longitudinal axis as the outer perimeter of body (22). This may enable PE tube (200) to collapse to fit within cannula (14). When PE tube (20) is disposed in a tympanic membrane (TM), petals (28) are located medially (i.e., on the middle ear side) while flange (26) is located laterally (i.e., on the outer ear side).

By way of example only, PE tube (20) may also be configured in accordance with at least some of the teachings of U.S. Pat. No. 9,011,363, entitled "Tympanic Membrane Pressure Equalization Tube," issued Apr. 21, 2015, the disclosure of which is incorporated by reference herein; and/or at least some of the teachings U.S. Pub. No. 2014/0276906, the disclosure of which is incorporated by reference herein. Other suitable forms that PE tube (20) may take will be apparent to those of ordinary skill in the art in view of the teachings herein.

II. Exemplary Tube Delivery Simulation Devices

Delivery of a PE tube (20) via a PETDD (10) has advantages over an entirely manual procedure but may still have some associated risks depending on the skill level of the operator. Pre-delivery pressure and tip (16) angle, as well as tip (16) placement upon the surface of the TM must be precisely controlled for proper placement. Improper tip (16) or angle may result in the PE tube (20) failing to pass through the TM before the petals (28) flex outwardly, and the PE tube (20) may fall into the ear canal resulting in a failed delivery. Improper tip (16) placement upon the surface of the TM may result in the PE tube (20) contacting the annulus or malleus, requiring removal and resulting in a failed delivery. Improper tip (16) angle and apposition relative to the TM may also result in a failed delivery. Such risks can be mitigated through training and repeated performance of the procedure in a simulated procedure environment.

Figure 4:
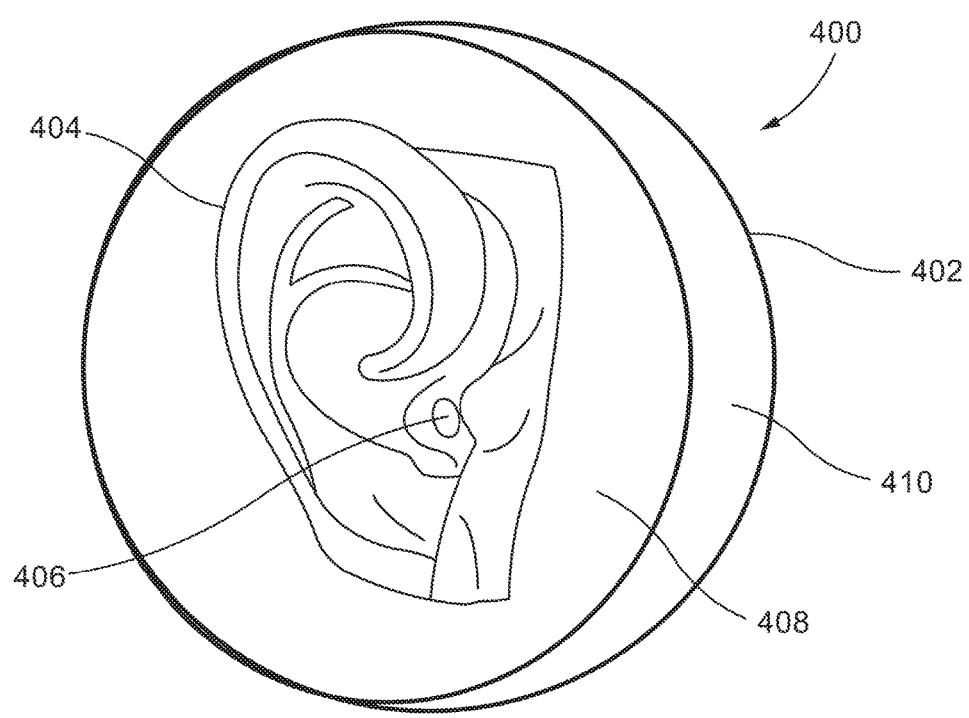
FIG. 4 depicts a perspective view of an exemplary ear model for use with a PETDD training system.

FIG. 4 shows an exemplary ear model (400) for use in a simulated PETDD training procedure. The ear model (400) may be created from a variety of materials, including plastic, rubber, silicone, resin, or other materials depending upon such factors as desired cost, durability, or realism. The exemplary ear model (400) is shown as being cylindrical with a rear surface (402), an edge (410), a front surface (408), an external ear (404), and an ear canal opening (406). The ear model (400) is shown as being cylindrical, but may be any desired shape such as a rectangular box or a half-spheroid, or may in some embodiments be shaped to anatomically resemble a partial or complete human head, depending upon such factors as desired cost and realism. The rear surface (402) is flat and allows the ear model (400) to be placed flush against a middle ear simulating device (500) such as that shown in FIG. 5, with such placement shown in FIG. 6. In embodiments where the ear model (400) resembles a full or partial human head there may instead be a compartment in which a middle ear simulating device (500) may be placed, as opposed to a rear surface (402). The front surface (408) may be flat or curved depending upon the shape of the ear model (400) itself, and may be featureless or may have a surface that resembles human skin.

Figure 9:
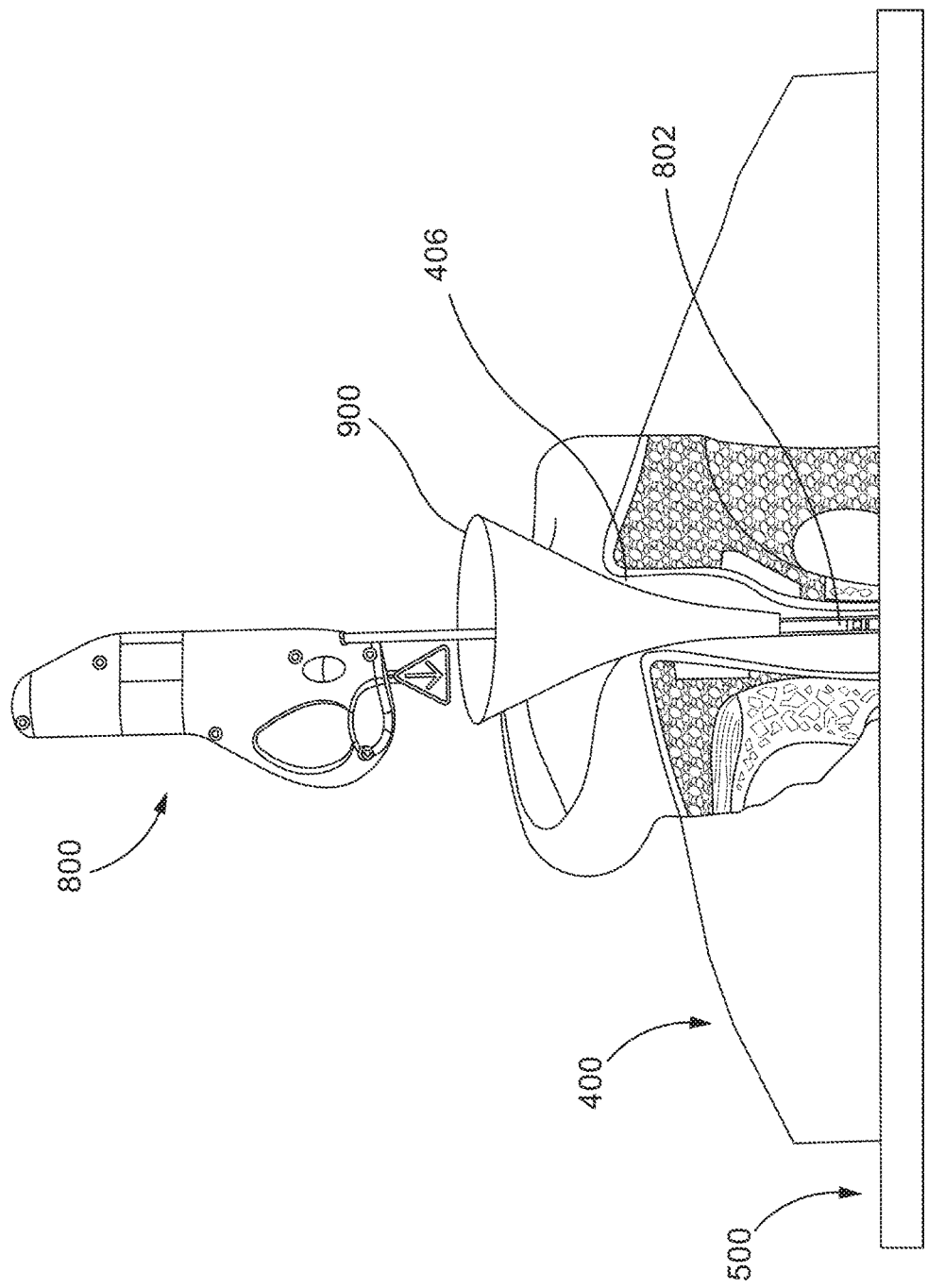
FIG. 9 depicts a cross sectional view of the exemplary ear model of FIG. 4 attached to the exemplary middle ear simulating device of FIG. 5 with the exemplary training PETDD of FIG. 8 positioned for simulated delivery.

The external ear (404) anatomically resembles a human ear, with size, depth, and dimensions varying for each particular ear model (400), with such differences being chosen to simulate, for example, the external ear of an infant, toddler, adolescent, or adult. The ear canal opening (406) is an opening in the ear model (400) which opens from within the external ear (404) and travels through the front surface (408) and out of the rear surface (402). The ear canal opening (406) may be a featureless passage, or may be anatomically modeled after the human ear canal, and may have varying dimensions and characteristics to simulate, for example, the ear canal of an infant, toddler, adolescent, or adult. A cross sectional view of an anatomical ear canal opening (406) traveling through an ear model (400) is shown in FIG. 9, as well as a training PETDD (800) inserted through a speculum (900) into an ear canal opening (406) of an ear model (400). The simulated tip (802) is in contact with the touch sensitive surface (502) of a middle ear simulating device (500) attached to the rear of the ear model (400).

In some embodiments, the ear model (400) may have embedded electronics, such as pressure sensors within the ear canal opening (406) to detect the level of stress placed upon one or more parts of the ear canal during the insertion of a speculum, a simulated PETDD, or other device. In other embodiments, the ear model (400) may have embedded electronics to aid in measuring the depth of insertion of a PETDD into the ear canal opening (406), such as one or more position sensing photo eyes, a short range RFID reader configured to detect the presence of an RFID signal embedded within a simulated PETDD, a three dimensional depth camera, or other similar devices. Various kinds of electronic components that may be integrated into ear model (400), as well as various ways in which such components may be utilized, will be apparent to those of ordinary skill in the art in view of the teachings herein.

Figure 5:
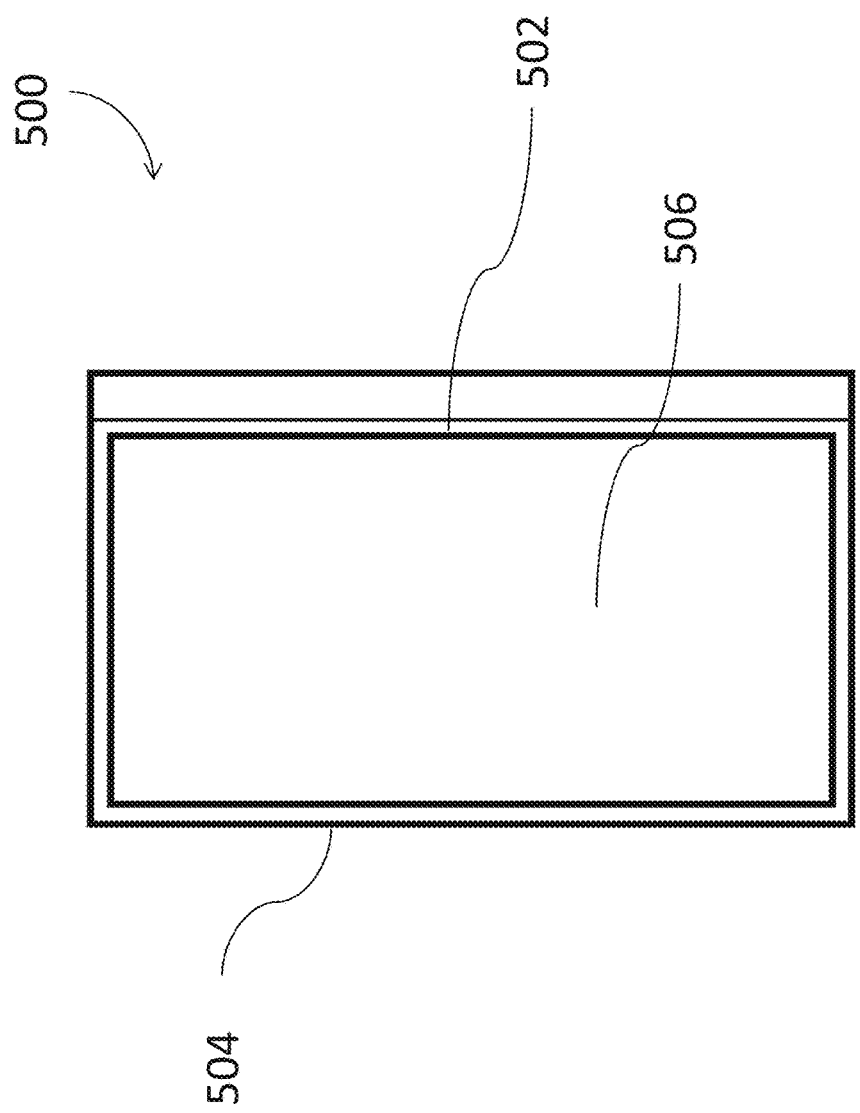
FIG. 5 depicts a perspective view of an exemplary middle ear simulating device for use with a PETDD training system.

The exemplary middle ear simulating device (500) shown in FIG. 5 may be a computing device such as a smartphone or tablet, etc., having a touch sensitive surface (502), a raised bezel (504), and a display (506). The middle ear simulating device (500) may comprise a tablet, smartphone, touch sensitive laptop monitor, touch sensitive desktop monitor, a proprietary custom built device, or other device having capability of presenting a static or dynamic image of a middle ear, sensing a contact or applied pressure, and communicating data generated from sensors. The combined middle ear simulating device (500) and ear model (400) may be referred to as an assembled simulator (600), which should be understood to have all of the characteristics of its components.

Figure 6:
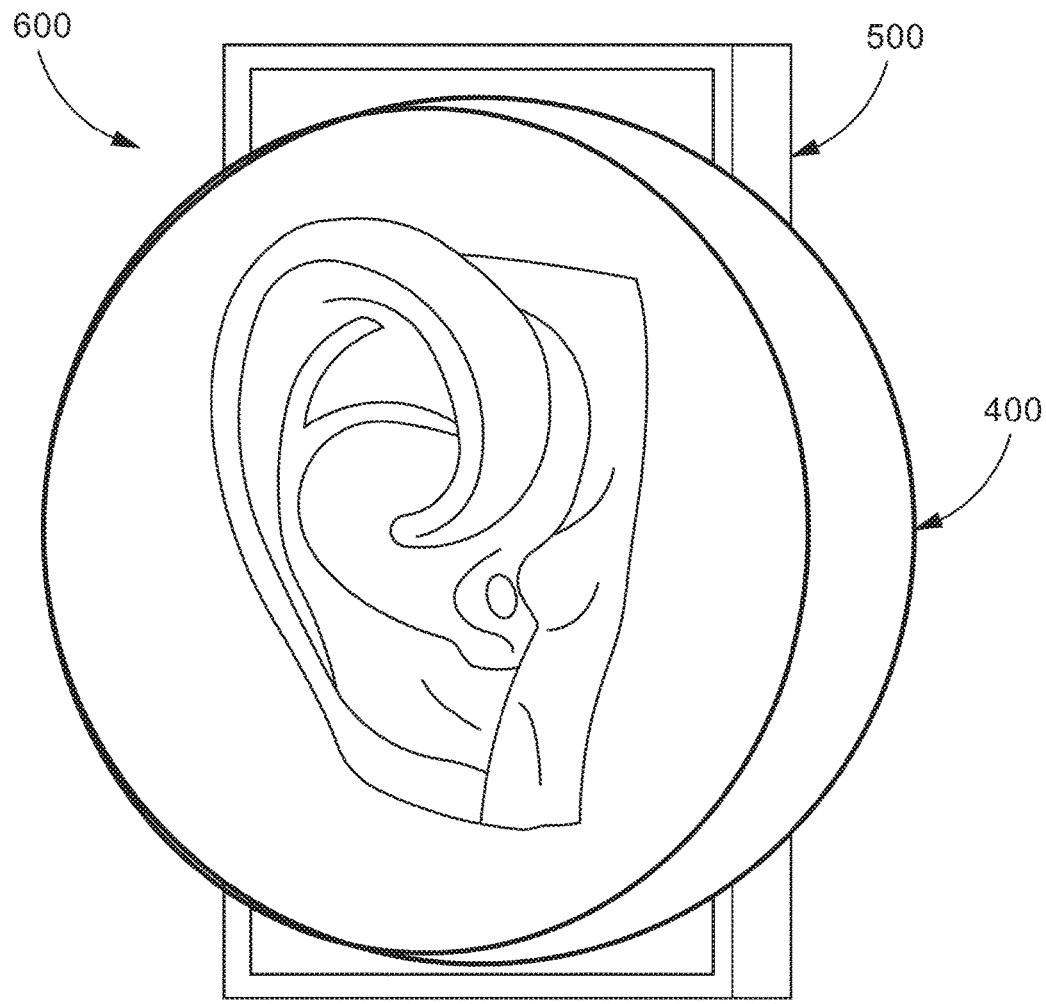
FIG. 6 depicts a perspective view of the exemplary ear model of FIG. 4 attached to the exemplary middle ear simulating device of FIG. 5.

The middle ear simulating device (500) may display an image of an anatomical middle ear, including portions of an ear canal and a tympanic membrane, via the display (506). The displayed image may be a photographic image, a video segment, a three dimensionally rendered and displayed model, or other similar displayable format, including combinations thereof. The displayed image may resemble portions of the middle ear of an infant, child, adolescent, or adult, and may display a middle ear with additional characteristics, such as an injury, previous PE tube (20) delivery site, infection, or other medical conditions that may be encountered during a real-life PE tube (20) delivery procedure. The displayed image may be positioned upon the display (506) and increased or decreased in size so that it creates a near-seamless visual transition from the ear model (400) to the middle ear simulating device (500) when observed through the ear canal opening (406) of an ear model (400) placed over top of the display (506) of the middle ear simulating device (500) as shown in FIG. 6 and in cross sectional view in FIG. 9. In this manner, the middle ear simulating device (500) and ear model (400) may be used to visually simulate the external ear, ear canal, tympanic membrane, and other visible portions of the ear to an external observer.

The touch sensitive surface (502) of the middle ear simulating device (500) may have one or more capabilities, such as the ability to sense contact with an object through use of an inductive, capacitive, or other type of touch screen, or the ability to sense the magnitude and direction of force applied to the touch sensitive surface (502) through use of pressure sensitive plate or switch, or both. The touch sensitive surface (502) may be the same component as the display (506) or a separate component, depending upon a particular implementation. In the present example, touch sensitive surface (502) spans across the full surface area of the image displaying region of display (506).

Touch sensitive surface (502) is configured to detect contact or pressure that is applied to touch sensitive surface (502) by, for example, a speculum, PETDD, endoscope, or other device that is inserted into the ear canal opening (406) to a depth that would cause it to contact the touch sensitive surface (502). Touch sensitive surface (502) also detects the location at which the pressure is applied across the surface area of touch sensitive surface (502). In some versions, touch sensitive surface (502) simply detects the presence of force or pressure and the spatial location of force or pressure that is applied to touch sensitive surface (502). In some such versions, touch sensitive surface (502) does not provide a force sensitivity that is capable of determining the magnitude of the force applied to touch sensitive surface (502). Thus, contact made with a high magnitude of force may be detected in the same fashion as contact made with a low magnitude force, with each contact being detected merely as contact with touch sensitive surface (502).

In some other versions, the middle ear simulating device (500) may have a display (506) with an integrated touch sensitive surface (502) that is capable of both capacitive touch sensing capabilities and pressure sensing capabilities. In other words, touch sensitive surface (502) may be configured to detect the actual magnitude of force applied and thereby provide a force magnitude value. As yet another merely illustrative variation, the middle ear simulating device (500) may have a display (506) with an first, integrated touch sensitive surface (502) that is only capable of capacitive touch sensing capabilities; and a second touch sensitive surface (502) that is able to detect and measure applied forces placed over the display (502) or on the rear surface of the middle ear simulating device (500). For example, a commercially available tablet or smartphone may not have the ability to sense the magnitude of force applied to its screen, but a pressure sensitive pad, overlay, or plate placed over top of the display (502), or on the rear of the middle ear simulating device (500), may provide such a capability.

In some versions where touch sensitive surface (502) does not provide a force sensitivity that is capable of determining the magnitude of the force applied to the touch sensitive surface (502), the touch sensitive surface (502) may nevertheless rely on other data to calculate a magnitude of the force applied to the touch sensitive surface (502). For instance, as will be described in greater detail below, a deformable instrument tip may be pressed against the touch sensitive surface (502). The degree of deformation of the deformable tip may be a function of the magnitude of the force at which the tip is pressed against the touch sensitive surface (502). This degree of deformation may be detected by the touch sensitive surface (502) as the surface area of engagement between the deformable tip and the touch sensitive surface (502). For instance, engagement across a relatively low surface area may indicate a relatively low magnitude in the force of engagement; while engagement across a relatively high surface area may indicate a relatively high magnitude in the force of engagement. Software in middle ear simulating device (500) may thus calculate an approximate magnitude of the force at which the deformable tip is pressed against the touch sensitive surface (502) based on the size of the detected surface area of engagement. Moreover, the geometry of the surface area of engagement may be indicative of the angle at which the deformable tip is pressed against the touch sensitive surface (502). Software in middle ear simulating device (500) may thus also calculate an approximate direction of the force at which the deformable tip is pressed against the touch sensitive surface (502) based on the geometry of the detected surface area of engagement. Various suitable ways in which the software may be programmed to provide such functionality will be apparent those of ordinary skill in the art in view of the teachings herein.

Regardless of the ability of touch sensitive surface (502) to sense an actual magnitude of an applied force rather than merely detecting the presence of an applied force or contact, the touch sensitive surface (502) may also rely on its spatial sensitivity to detect the dimensions of the contact point of an object in contact with touch sensitive surface (502). The information about the force (magnitude or mere presence), location, and surface area of contact may be used to determine the pressure, location, and apposition of an object contacting the display relative to a displayed image of the TM, as will be described in more detail below.

In the present example, the raised bezel (504) provides contact points for the rear surface (402) of the ear model to keep it slightly elevated from the pressure sensitive touch screen (502) and prevent general contact of the ear model (400) against the touch sensitive surface (502) in order to reduce false contact readings. The touch sensitive surface (502) may also be configured to ignore all contact outside of the simulated middle ear image, to reduce the likelihood that a contact with the ear model (400) may be falsely detected as contact from an object inserted into the ear canal opening (406). It should therefore be understood that raised bezel (504) is merely optional, such that raised bezel (504) may be omitted if desired.

Figure 7:
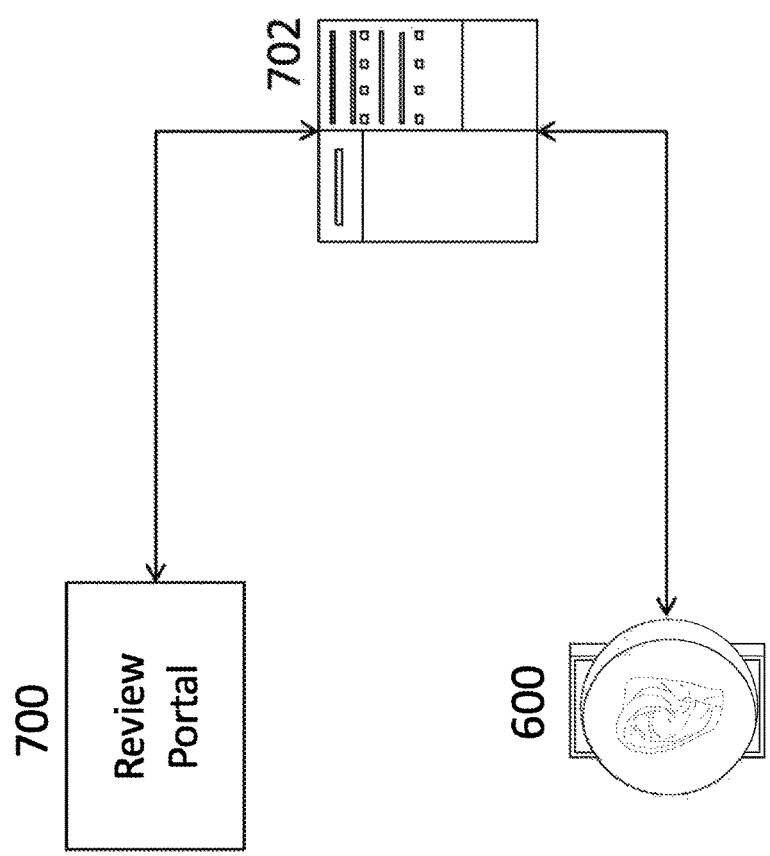
FIG. 7 depicts an exemplary high level system architecture of devices used within a PETDD training system.

In some versions, simulator (600) may be used alone, in a localized fashion, without necessarily requiring any kind of remote connectivity. For instance, middle ear simulating device (500) may be loaded with software that is operable to provide the image of the TM and middle ear anatomy, and perform at least some of the steps described below, simply by being executed locally on middle ear simulating device (500). The results may be process and stored locally on middle ear simulating device (500). In some other versions, however, middle ear simulating device (500) may be coupled with remote components to define a testing system. For instance, FIG. 7 shows an exemplary high level system architecture of devices that may be used within a PETDD training system. In the example shown, the assembled simulator (600) is in communication with a testing server (702). Communication may be across a wide area network or local area network, via a wired connection such as Ethernet, USB, optical cable, or similar wired connection, via a wireless connection such as Wi-Fi, Bluetooth, near field communication, radio, or similar wireless connection, or via any similar communication type. The assembled simulator (600) may receive communications from the testing server (702) providing simulation software and configuring the characteristics and parameters of a training exercise, causing training exercises to begin or end, causing the characteristics of a training exercise to change during the exercise, or other functions related to managing aspects of training simulation, as will be discussed in more detail below.

The assembled simulator (600) may send communications to the testing server (702) providing various data generated by a device or sensor included in the assembled simulator (600) such as test results, real time simulation data, mirrored images, video, or graphical renderings, and other similar data, as will be discussed in more detail below. The testing server (702) may act as a centralized long-term custodian of data related to training simulations, including both data generated from performed tests as well as configurations and software that may be distributed to assembled simulators (600) to provide additional test procedures, updated test procedures, updated device firmware, and other similar distributions. In some embodiments, there may be no testing server (702), or its functions may be provided by the assembled simulator (600) or another device.

A review portal (700) may be provided in the form of a web application or desktop application that is configured to be accessed by test administrators and trainees to review training results, prepare for future training procedures, configure custom training procedures, and other functions relating to the administration, performance, and review of training simulations. The review portal (700) may have its own data store, or may receive data from the testing server (702) in order to provide information and functionality to users. It should be understood that the review portal (700) may be provided via the middle ear simulating device (500), if desired. In other words, as noted above, the various functionality described herein as being provided through a system of networked components may also simply be provided via the middle ear simulating device (500) alone.

Figure 8:
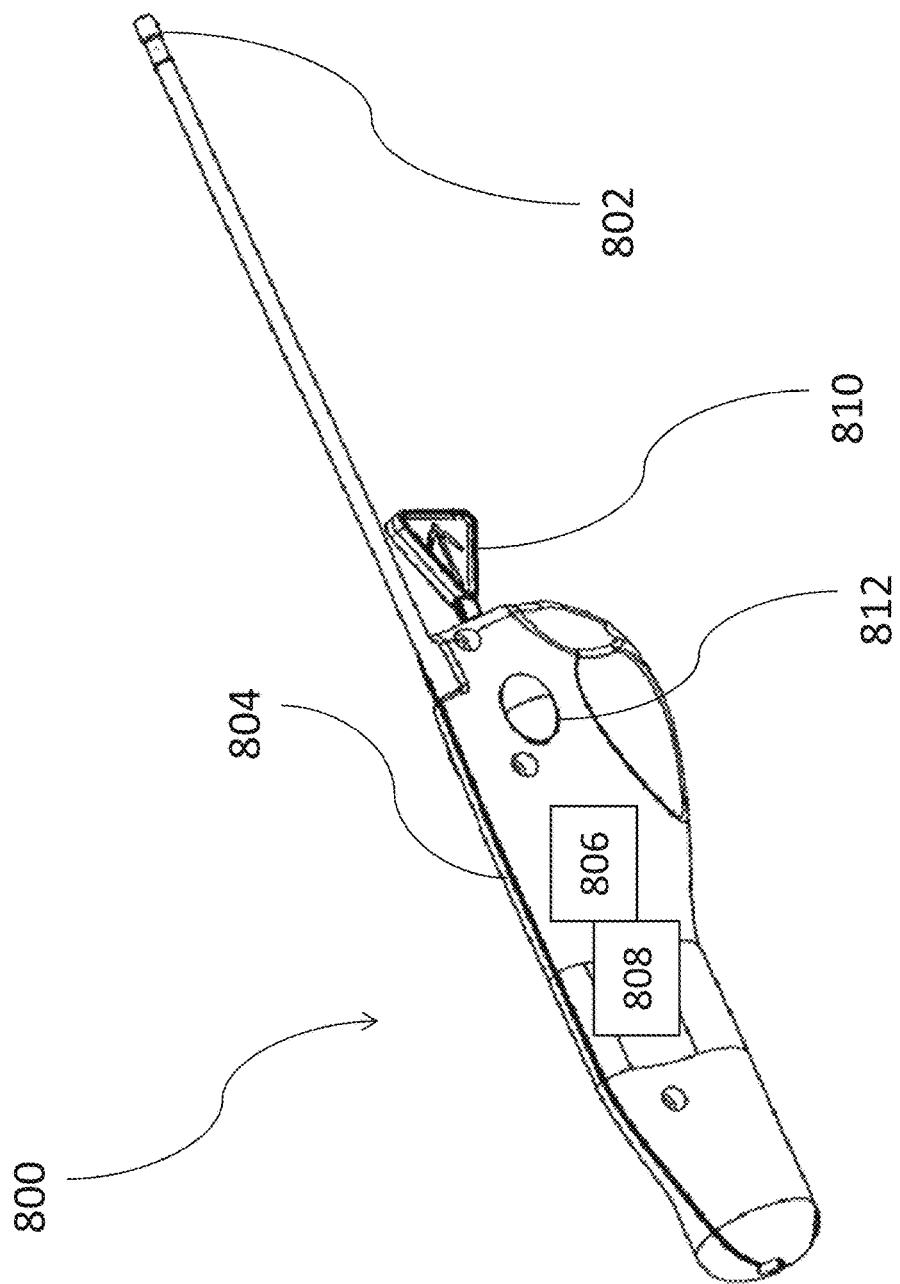
FIG. 8 depicts a perspective view of an exemplary training PETDD for use with a PETDD training system.

In some versions, a conventional PETDD (10) is used with the assembled simulator (600) in order to train an operator how to properly position the PETDD (10) in relation to the TM. In such versions, it may be desirable to maintain pin (19) in handpiece (12) in order to avoid pressing of button (18). Thus, the operator may practice positioning of the PETDD (10) without actually deploying a PE tube (20). In some other versions, a modified version of the conventional PETDD (10) may be used with the assembled simulator (600) in order to provide enhanced functionality when training an operator how to properly position the PETDD (10) in relation to the TM. For instance, FIG. 8 shows an exemplary training PETDD (800) that is configured for use with the assembled simulator (600). Such a training PETDD (800) could have an overall appearance and weight similar to that of an actual PETDD (10), and could include such components as a handpiece (804), tip (802), pin (810), button (812), and other features.

Depending upon such factors as desired cost and capabilities, the handpiece (804) of FIG. 8 may contain one or more additional components such as a single-board computer or other micro form factor computing device, power source, or wireless communication such as Bluetooth, Wi-Fi, near field communication, RFID, or other similar capability. A wireless communication capability within the handpiece (804) may allow certain information or events to be communicated to the assembled simulator (600), such as the removal of the simulated pin (810), the actuation of the simulated button (812), or a detected magnitude and direction of contact applied to the simulated tip (802).

The simulated tip (802) may be a capacitive or inductive tip to allow a middle ear simulating device (500) to more accurately detect the location and forces applied by the simulated tip (802) against the touch sensitive surface (502). In some versions, the simulated tip (802) may also have an integral sensor that is configured to detect the magnitude and direction of forces placed upon the simulated tip (802). Such detected information could be used to aid in determining the pressure and apposition of the simulated tip (802) when pressed against a displayed image of a middle ear and TM on touch sensitive surface (502). Data from the force sensor may be communicated to middle ear simulating device (500) wirelessly as described above; or via wire if desired.

As yet another merely illustrative example, the simulated tip (802) may be deformable and may be configured in the form of a half-sphere or other appropriate shape. Such a deformable tip (802) could be made from a material that would be detected by a capacitive or inductive touch sensitive surface (502). The collapsible tip (802) can deform when pressed against a surface of the middle ear simulating device (500), with the shape and size of the resulting contact against the touch sensitive surface (502) being an indicator of the magnitude and direction of the pressure being applied through the simulated tip (802), as noted above. For example, if the simulated tip (802) has a natural diameter of 3 mm, pressing the tip (802) against a touch sensitive surface (502) with a force of 1 Newton per inch might cause the diameter to increase to 4 mm, while a force of 2 Newton's per inch might cause the diameter to increase to 5 mm, with such changes being detected by the touch sensitive surface (502). In this manner, the diameter of the deformed tip (802) can be used to provide an indication of force, which may be used as a supplement or substitute to force measurements provided by a touch sensitive surface (502), whether or not it includes pressure sensing capabilities.

Similarly, the deformed shape of a deformable version of tip (802) may provide an indicator of the direction of the force, which also indicates the angle and apposition of the PETDD (800) itself relative to the surface it is being pressed against. For example, a tip (802) pressed against a surface at an angle of 90 degrees, perfectly perpendicular to the surface, would deform evenly with the resulting shape being circular. The same tip (802) pressed against a surface at an angle of 45 degrees would instead deform into an elliptical shape, with the characteristics of the elliptical shape, such as the lengths and orientations of its major and minor axis, indicating the angle at which the tip (802) is contacting the touch sensitive surface (502).

A training PETDD (800) with a single-board computer could provide additional training functionality such as haptic feedback for certain events during training, audible feedback, data collection and processing, and other functions. The presence of a single-board computer may also allow for more realistic simulated use of the training PETDD (800). For example, the simulated button (812) may be disabled until the simulated pin (810) is pulled. After the simulated pin (810) is pulled, pressing the simulated button (812) may result in a combination of haptic and audible feedback resembling the sound and vibrations created by an actual PETDD (10) during delivery of a PE tube (20), as well as a wireless communication from the training PETDD (800) to the assembled simulator (600) indicating a delivery event.

In some embodiments, the handpiece (804) could contain a rotational sensor (806), such as a gyroscope, and a positional sensor (808), such as a multi-axis accelerometer. A single-board computer embedded within the handpiece (804) could receive signals from the rotational sensor (806) and the positional sensor (808) and track changes in rotation and position relative to an origin point, such as the assembled simulator (600). Rotational and positional data could be communicated via wireless communication such as Bluetooth to the assembled simulator (600) throughout the training procedure. Such a training PETDD (800) may also have visual feedback, such as one or more colored lights, displays, or other visual elements, that may be configured to provide immediate visual feedback related to various parts of the simulation. For example, an LED may illuminate with a green light to indicate that a pressure is being applied to the simulated tip (802) that is equal to or within an appropriate range of a predetermined pressure threshold; and/or that a device angle is equal to or within an appropriate range of a predetermined angle. Similarly, an LED may illuminate with a red light to indicate that a pressure applied is below or above a certain threshold (or otherwise outside of an appropriate range); and/or that a device angle is inappropriate for achieving proper apposition with a simulated TM.

III. Exemplary Simulator Configuration

Figure 10:
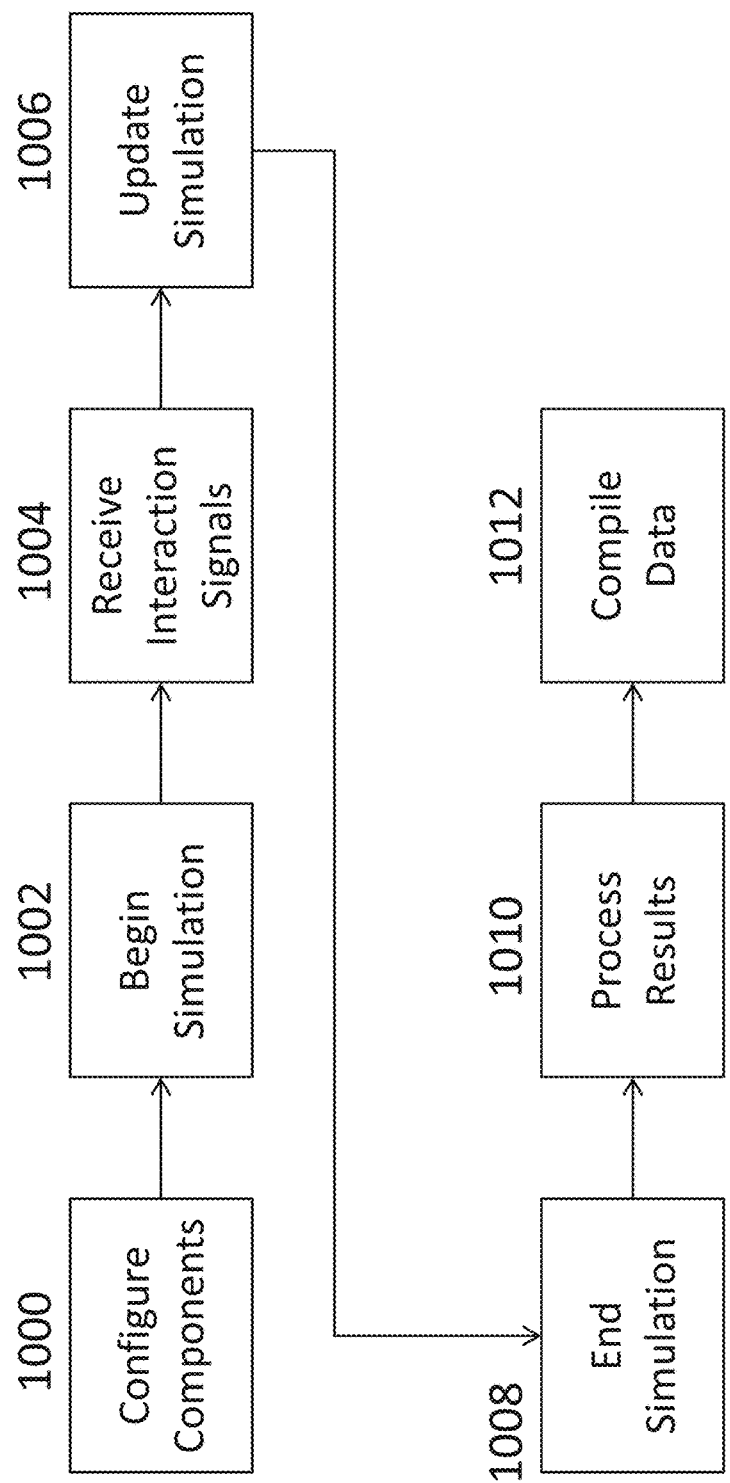
FIG. 10 depicts a flowchart of exemplary high level steps performed during a PETDD training session.

The exemplary simulation devices described above may be configured to simulate an interactive PE tube (20) delivery environment, allowing a trainee to perform a simulated procedure and receive feedback describing the outcome. FIG. 10 shows a flowchart of exemplary high level steps that may be performed to configure simulator devices and execute a simulated training procedure. Initial preparations for executing a training simulation include configuring the components (1000), including arranging and enabling the devices and tools to be used during the simulation, as well as configuring simulator software so that the simulation exhibits the desired characteristics and challenges. The simulation may begin (1002) based upon a start signal generated by a device, such as a simulated tool or computer, and may cause the simulation software and configured devices to begin actively tracking and generating data, or display other characteristics indicating that a simulation is underway.

During the simulation, one or more simulator devices may receive or generate interactions signals (1004), such as a middle ear simulating device (500) generating interaction signals indicating that a force is being applied to its touch sensitive surface (502), or a an assembled simulator (600) receiving interaction signals wirelessly from a training PETDD (800) indicating that the training PETDD's (800) position, rotation, or angle has changed. As interaction signals (1004) are generated and received, the simulation may be updated (1006) to reflect changes indicated by a received (1004) interaction signal. For example, if a simulated button (812) or other input available via the training PETDD (800) or assembled simulator (600) is pressed to indicate a simulated delivery of a PE tube (20), one or more simulator devices or displays may be updated to reflect that a simulated PE tube (20) delivery has occurred, such as updating an image of a TM displayed via the display (506) to show a graphical representation of a delivered PE tube (20).

The simulation ends (1008) when an end signal is generated by a device. For example, a press of the simulated button (808) may cause a simulation end signal to be generated and received by the assembled simulator (600), causing the generation and collection of simulation data to halt. Likewise, an interaction with the assembled simulator (600) may cause the simulation to end. Simulation results may be processed (1010) by the assembled simulator (600) so that various parameters may be examined, compared against thresholds, and a determination made if the simulated procedure was successful. A permanent record of some or all of the data generated during and after the simulation may be compiled and retained (1012) by the testing server (702) to be used to aid in refining or creating simulation procedures, determining future training needs for trainees, or to be viewed via the review portal (700).

Figure 11:
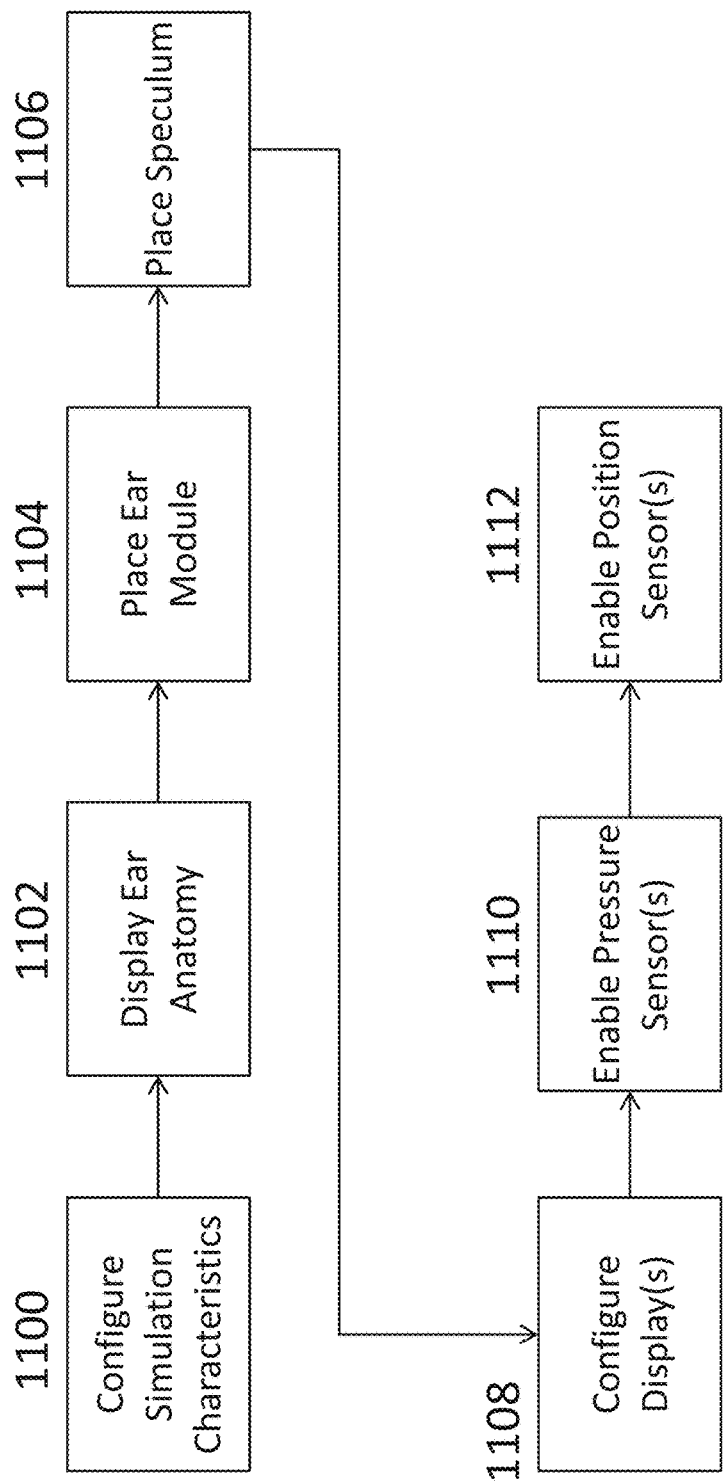
FIG. 11 depicts a flowchart of exemplary steps performed to configure hardware components in preparation for a PETDD training session.

FIG. 11 shows a set of exemplary steps that may be performed to configure components (1000) of a simulator (600). Simulation characteristics may be submitted by an administrator or trainee via the assembled simulator (600) or other device, or may be defined as part of one or more selectable pre-packaged simulation types. Simulation characteristics define the types of simulated images showed during a simulation, various thresholds defining success and failure for aspects of the simulation, what devices are in use during a simulation and what function they are performing, and other information. For example, simulation characteristics may define whether the middle ear image displayed via the middle ear simulator device (500) is that of a left ear or a right ear, whether it is the middle ear of an infant, child, adolescent, or adult, whether any additional medical conditions are present, such as an ear infection, scar tissue, deformity, or otherwise, whether the displayed visual may be a static image, a video, or a three dimensional rendering.

Simulation characteristics may include one or more thresholds defining, for example, the highest and lowest acceptable pressure that may be applied by a training PETDD (800) against the virtual TM, an ideal range of angles that the training PETDD (800) may be held at during delivery, the length of the delivery period during which tip pressure and angle must be consistent. Simulation characteristics may also include one or more locations upon a virtual TM image which are unacceptable delivery sites, such as locations that may cause the PE tube (20) to contact the annulus, malleus, pre-existing scar tissue or other injury, or other unacceptable delivery sites. Simulation characteristics may also include a definition of the technological capabilities of the training PETDD (800) being used, whether an internal sensor PETDD (800) is being used, whether a pressure sensitive tip (802) is in use, and other hardware connectivity and use definitions. Other suitable simulation characteristics will be apparent to those of ordinary skill in the art in view of the teachings herein.

Once defined, the simulation characteristics may be used to configure (1100) the affected devices and software appropriately. The configured (1100) ear anatomy may then be displayed (1102) via the middle ear simulating device (500). Middle ear simulating device (500) may also provide an audible and/or visible indication instructing the operator as to which ear model (400) should be retrieved and placed over ear simulating device (500). Once displayed (1102), an appropriate ear model (400) may be placed (1104) over middle ear simulating device (500) so that the ear canal opening (406) visually aligns with the displayed (1102) ear anatomy. Ear model (400) placement (1104) may be aided by guide grooves, markers, tabs, screws, or other means to aid in precise and stable placement of the ear model (400) on the middle ear simulating device (500). Various ear models (400) may be available in different sizes, and for the left and right ear, so that any configurable middle ear image will have a corresponding anatomically appropriate ear model (400) to enhance realism of the simulation.

Once ear model (400) placement (1104) and alignment is complete, a speculum (900) may be placed (1106) in the ear canal opening (406), as shown in FIG. 9. The speculum (900) provides a clear pathway for tools such as a training PETDD (800) and an endoscope (not shown) to pass through the ear model (400) to arrive in close proximity with the virtual middle ear image of the middle ear simulating device (500).

When present and defined for a particular simulation, additional displays may be configured (1108). For example, the display of the assembled simulator (600) may be mirrored to an external output device such as a tablet or other computing device. One or more pressure sensors may be enabled (1110) and calibrated to a neutral setting before any interaction with the simulator (600) begins. Similarly, one or more positional sensors may be enabled (1112) and calibrated to a neutral setting. Calibration of positional sensors may vary based on the particular embodiment and implementation. For example, in an embodiment using internal rotation and position sensors (806, 808), position sensor calibration may involve following commands such as placing the training PETDD (800) in a holder, moving the training PETDD (800) to the ear model (400), or making other rotational and positional movements as instructed by an accompanying video or graphic.

Figure 12:
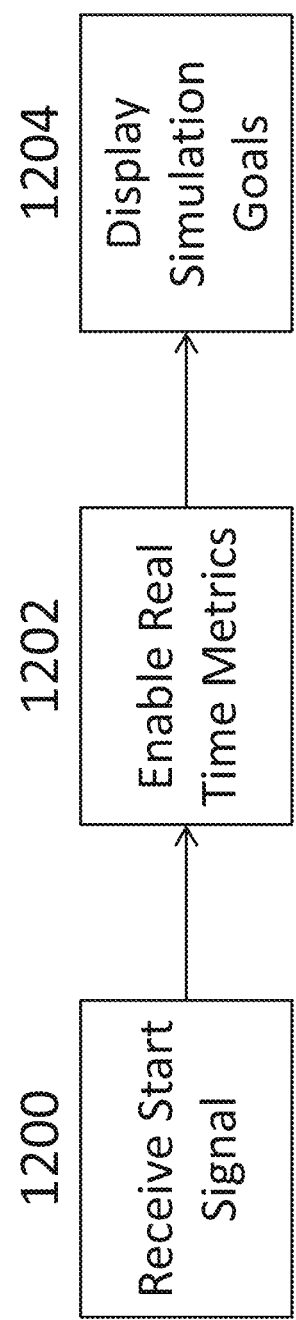
FIG. 12 depicts a flowchart of exemplary steps performed to initiate a PETDD training system and begin a PETDD training session.

FIG. 12 shows a set of exemplary steps that may be performed to begin a PETDD training session. Once component configuration is complete (1000), a device of the simulator may receive a start signal (1200) indicating that the simulation should begin. The source and recipient of the start signal will vary by a particular embodiment and implementation. In some embodiments, pressing the simulated button (812) will generate a simulation start signal, which will be wirelessly received by the assembled simulator (600). In others, a control on the assembled simulator (600) may be interacted with, signaling to other devices that the simulation has begun. Once devices have been notified of a start signal (1200), real time metrics may be enabled (1202), causing the devices to begin generating data related to the simulation, and causing the assembled simulator (600) and/or testing server (702) to begin gathering such real time data.

Real time metrics may include any data that may be tracked or generated during the simulation. All tracked data may be plotted along a procedure timeline so that one or more parameters can be examined on a second-by-second basis. For example, simulated tip (802) pressure, touch sensitive surface (502) pressure, training PETDD (800) rotation, location, and angle, simulated pin (810) status, simulated button (812) status, video from an endoscope camera, and/or other useful metrics may be captured and used to determine the success or failure of a simulated delivery or provide guidance to a trainee. Simulation goals may also be displayed (1204) via the assembled simulator (600), along with a status indicator of success, failure, or pending for each measurable goal.

Figure 13:
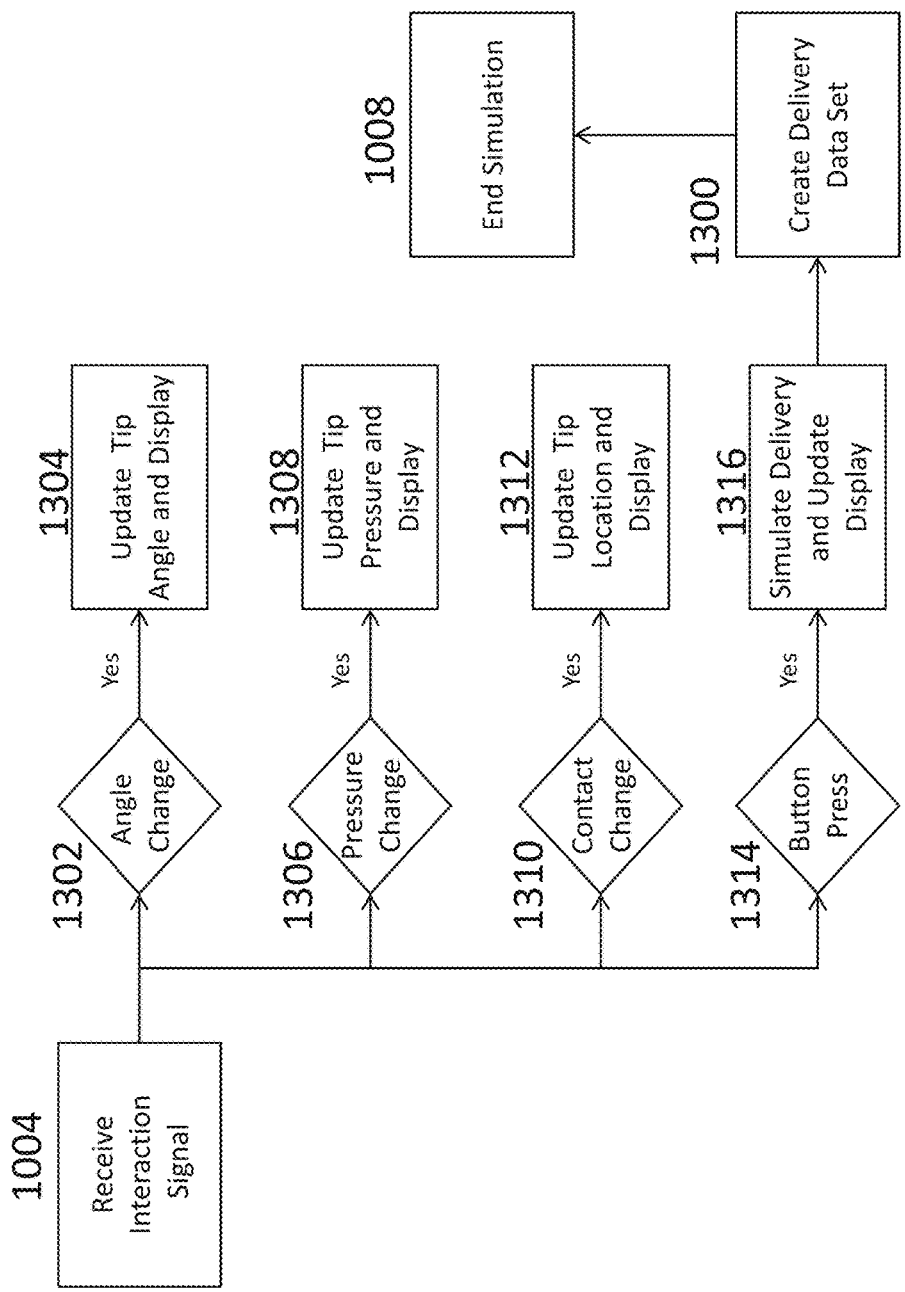
FIG. 13 depicts a flowchart of exemplary steps performed to receive and react to interaction signals generated during a PETDD training session.

FIG. 13 shows an exemplary set of steps that may be performed to receive (1004) and react (1006) to interaction signals generated during a PETDD training session. An interaction signal may be an actively generated signal, such as the pressing of the simulated button (812), or may be semi-passively generated, such as change in angle or position of the training PETDD (800), a change in force applied to the middle ear simulating device (500), a change in contact location on the face of the touch sensitive surface (502), or other event that results in a change in the tracked real time metrics that suggests a trainee interaction with the simulator. For example, a trainee grasping a training PETDD (800) lying flat on a surface and bringing it into the air will cause a change in the angle of the training PETDD (800), which will be reflected in a change in the tracked real time metrics. When a change in angle is detected (1302), a value representing the current or most recent angle of the training PETDD (800) may be updated on the assembled simulator (600), and one or more displays may be updated (1304) to reflect a change in the angle of the training PETDD (800) relative to a prior state. In this manner, a change in angle may cause a display to update a displayed angle, or may cause a three dimensional rendering of the simulation to be updated to reflect a change in the angle of a rendered PETDD (800) and tip (802), so that a trainee may view a rendered simulation of the angle of a PETDD tip (802) to a TM closely approximating the actual position of the training PETDD (800) relative to the virtual TM displayed via the middle ear simulating device (500). Such a rendered view may provide additional helpful perspectives for trainees who are not yet accustomed to viewing the delivery site through a microscope, endoscope camera, or otherwise.

A detected change in pressure that is applied to a pressure sensor enabled simulated tip (802) and/or a touch sensitive surface (502) may also be detected as an interaction signal when detected in the real time metrics. When a pressure change is detected (1306), a current or most recent tip (802) pressure value may be updated (1308) to reflect an increase or decrease in the amount of force applied, and one or more other devices may be updated (1308) to reflect the change. For example, a text output on the assembled simulator (600) may be updated to show a new force value; a training PETDD (800) may be updated to provide a visual, audible, or haptic feedback based upon the new force value; and/or a middle ear simulating device (500) may update a displayed virtual TM to reflect the change in pressure, such as by applying a colored gradient centered on the point of contact to reflect changes in exerted force in real time, or other similar changes.

A detected change in the point of contact on a touch sensitive surface (502) may also be detected as an interaction signal when detected in the real time metrics. This could include a simulated tip (802) being raised and lowered at a different location of the virtual image, or being drug along the virtual image, with each being tracked by the real time metrics differently. When a contact change is detected (1310), a current or most recent point of contact value may be updated (1312) to reflect the change in contact, and one or more devices may be updated (1312) to reflect the change. In addition to device updates and actions disclosed in relation to other interaction signals, a change in point of contact may cause a displayed virtual TM image to be updated to reflect the new point of contact, such as by the placement of a crosshair or other marker. Other feedback may be provided, such as by a visual or haptic feedback via a training PETDD (800) indicating whether the new point of contact is appropriate for deployment. A three dimensional rendering of the simulated procedure may also be updated to reflect the change in point of contact so that a trainee may view alternate perspectives of a rendered PETDD contacting a point on a rendered TM that closely approximates the training PETDD (800) and virtual TM displayed via the middle ear simulating device (500).

A detected removal of the simulated pin (810) and subsequent actuation of the simulated button (812) may be detected as an interaction signal. The removal of the simulated pin (810) may cause the simulated button (812) to become active, and may also cause a display of the assembled simulator (600) to be updated, or a visual or audible feedback of the training PETDD (800) to occur. The pressing of the simulated button (812) may cause a simulated PE tube (20) delivery to occur and one or more devices and displays updated (1316) to reflect the simulated delivery. In addition to visual, audible, and haptic feedback via a device such as the training PETDD (800), a simulated delivery (1316) may cause the virtual TM displayed via the middle ear simulating device (500) to be updated to reflect the presence of a PE tube (20) at the most recent point of contact, and may also cause a three dimensional rendering of a PE tube (20) and TM to be created and displayed via one or more devices so that a trainee can examine the result of the simulated delivery. Additionally, a delivery data set may be created (1300) containing the real time metrics and other data generated during the simulation, or an important subset of such data. For example, a delivery data set could include data describing the tip (802) angle, tip (802) pressure against the virtual TM, and point of contact between the tip (802) and the virtual TM during a period of time beginning just before the simulated button (812) was pressed, throughout the duration of the delivery event, and immediately after the end of the delivery event. Once the delivery data set is created (1300), the active portion of the simulation is complete (1008).

Figure 14:
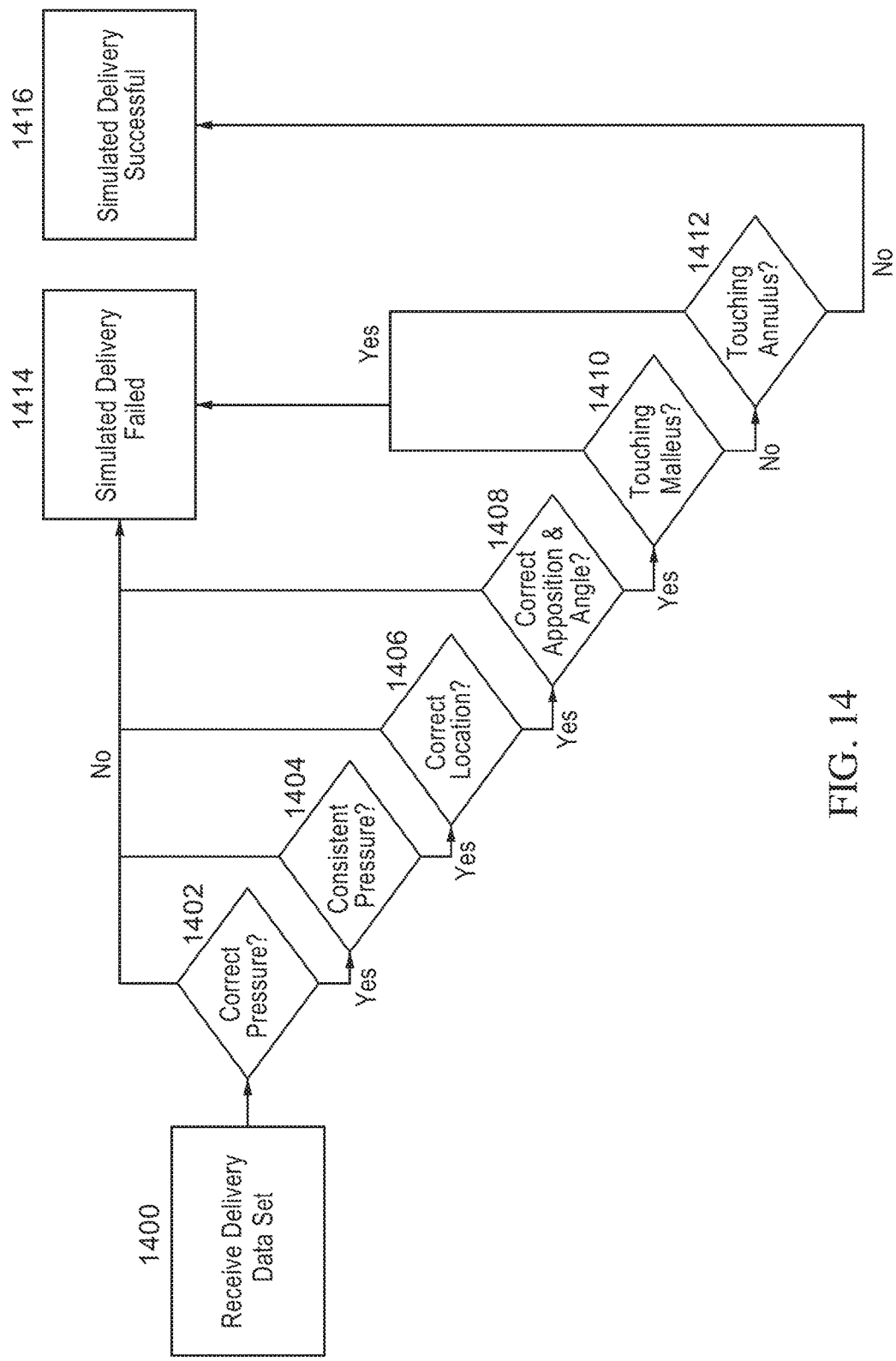
FIG. 14 depicts a flowchart of exemplary steps performed to process the results of a PETDD training session.

FIG. 14 shows an exemplary set of steps that may be performed to process and determine the results (1010) of a PETDD training session. When a delivery data set is received (1400) upon completion of the simulation, one or more parameters may be examined to determine whether the simulation was a success. While the exemplary steps of FIG. 14 show parameters being analyzed in series, this is not a requirement and some embodiments may instead examine one or more parameters in parallel. The requirements for a successful delivery may also vary beyond what is shown in FIG. 14, or there may be a sliding score based upon a combination of factors rather than a simple success or failure indicator. In the shown embodiment, the delivery data set is examined to determine whether detected pressure upon the virtual TM was within defined acceptable ranges before, during, and immediately after the simulated delivery (1402). A pressure applied to the virtual TM exceeding a TM safety threshold at any point during a simulation can result in an indication of simulated delivery failure (1414). This could simulate a training PETDD (800) being inserted carelessly or too forcefully prior to delivery of a PE tube (20), causing a forceful contact with the TM that may result in rupture of the TM (and perhaps entry into the middle ear space) by the tip (802).

Pressure during a delivery event is also analyzed to verify that the pressure applied by a training PETDD (800) to the virtual TM is of a magnitude great enough that, if this were an actual PE tube (20) delivery, proper contact and apposition with the TM would be achieved, with a low magnitude resulting in an indication of simulated delivery failure (1414). A delivery event is the period beginning after pressing the simulated button (812) and continuing for a specified duration representing the length of an actual PETDD delivery. The delivery data set may also be checked to verify that the pressure applied during a delivery event is consistent (1404). The pressure applied by a training PETDD (800) to a virtual TM must be steadily maintained for the entirety of the delivery event, with anything more than slight variations resulting an indication of simulated delivery failure (1414).

The delivery data set may also be examined to determine if the delivery site was correctly chosen (1406). One or more allowable delivery sites may be specified during configuration of the simulation, with delivery sites varying in size, shape, and number so that a variety of delivery procedures and difficulty levels may be simulated. At the completion of a delivery event, the contact location of a training PETDD (800) against the virtual TM throughout the delivery event may be determined in order to verify that the contact location did not change throughout the delivery event, and that the final contact location is within a specified acceptable delivery site. If the contact location data shows significant variations during a delivery event, or if the delivery location is outside of a specified delivery site, an indication of simulated delivery failure may be provided (1414).

The delivery data set may also be examined to determine if the simulated tip (802) angle and apposition relative to the virtual TM are within a specified range throughout a delivery event (1408). A detected tip (802) angle derived from gyroscopic data, the touch sensitive surface (502), and/or a deformable tip (802) must be within a certain range throughout delivery to simulate proper angle of an actual PETDD (10) relative to a TM to ensure that the PE tube (20) is inserted into the TM perpendicularly, rather than being inserted diagonally into the TM. Apposition may also be determined from delivery data, through a combination of detected angle and detected pressure. Apposition must fall within a specified range to simulate the deflection of the TM caused by an actual PETDD tip (16) pressed against the flexible membrane. When a determined apposition and angle fall outside specified ranges, an indication of simulated delivery failure may be provided (1414).

The delivery data set may also be examined to determine if the delivery location would result in the PE tube (20) touching the malleus (1410), annulus (1412), or another component of the middle ear or inner ear if the simulated procedure were an actual PE tube (20) delivery. The locations of components of the middle ear and inner ear relative to a virtual TM may be specified during simulator configuration, so that different scenarios may be simulated. If delivery data indicates that the delivery site resulted in PE tube (20) contact with the malleus (1410), annulus (1412), or another part of the middle ear or inner ear, an indication of simulated delivery failure may be provided (1414). When all specified measurements of the delivery data set have been performed without triggering any automatic failures, an indication of simulated delivery success is provided (1416).

The types of analysis performed upon the delivery data set will vary depending upon the purpose and needs of a particular implementation. For example, in one embodiment focusing only on teaching a trainee the correct pressure applied to be applied, there may be no failure indication if angle, apposition, or delivery site location fall outside of typical boundaries. Additional factors may also be considered to determine if the delivery was a success or failure. For example, if the simulated procedure's duration exceeds a specified desirable length, it may be considered a failure. Other suitable conditions (and combinations of conditions) that may give rise to a determination of success (1416) and/or failure (1414) will be apparent to those of ordinary skill in the art in view of the teachings herein. Delivery failure (1414) and success (1416) indicators may be provided via one or more displays or devices, such as the display (506) of the middle ear simulating device (500), audible, visible, or haptic feedback of a training PETDD (800), and/or may be provided via another device so that the results of the test may be discussed with the trainee before the outcome is revealed.

IV. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An apparatus comprising: (a) a training pressure equalization tube delivery device ("PETDD"), the training PETDD comprising: (i) a handpiece, (ii) a cannula extending distally from the handpiece, and (iii) a tip at the distal end of the cannula; (b) an ear model, the ear model comprising: (i) an ear canal opening, and (ii) an ear canal; (c) a middle ear simulating device comprising: (i) a middle ear display, wherein the middle ear display is configured to show a virtual tympanic membrane, (ii) a touch sensitive surface, and (iii) a processor, wherein the middle ear simulating device is positionable to locate the middle ear display and the touch sensitive surface near the ear canal of the ear model, wherein the ear canal opening is configured to provide access for the tip of the training PETDD to reach the middle ear display and the touch sensitive surface via the ear canal.

Example 2

The apparatus of Example 1, wherein the middle ear simulating device is configured to provide tip contact location information generated by the touch sensitive surface in based on contact between the tip of the training PETDD and the touch sensitive surface.

Example 3

The apparatus of any one or more of Examples 1 through 2, further comprising a sensor, wherein the sensor is configured to sense a magnitude of force applied by the tip to the touch sensitive surface.

Example 4

The apparatus of Example 3, wherein the sensor is integrated into the middle ear simulating device.

Example 5

The apparatus of Example 3, wherein the sensor is integrated into the training PETDD.

Example 6

The apparatus of any one or more of Examples 1 through 5, further comprising a sensor, wherein the sensor is configured to sense an orientation of the tip relative to the touch sensitive surface.

Example 7

The apparatus of Example 6, wherein the sensor is integrated into the training PETDD.

Example 8

The apparatus of any one or more of Examples 1 through 7, wherein the training PETDD further includes a button, wherein the middle ear simulating device is configured to capture data indicating one or more of the following, in response to actuation of the button: (i) tip contact location information generated by the touch sensitive surface in based on contact between the tip of the training PETDD and the touch sensitive surface, (ii) a magnitude of force applied by the tip to the touch sensitive surface, or (iii) an orientation of the tip relative to the touch sensitive surface.

Example 9

The apparatus of any one or more of Examples 1 through 8, wherein the processor is configured to execute instructions to evaluate a quality of tip apposition in response to actuation of the button, wherein the quality of tip apposition is evaluated based on data indicative of tip orientation and data indicative of a force applied by the tip to the touch sensitive surface.

Example 10

The apparatus of any one or more of Examples 1 through 9, further comprising a user feedback feature, wherein the processor is configured to execute instructions to: (i) determine whether a location of engagement between the tip of the training PETDD and the touch sensitive surface is within a predefined area, and (ii) drive the user feedback feature to indicate whether the tip contact location is within the predefined area.

Example 11

The apparatus of any one or more of Examples 1 through 10, further comprising a user feedback feature, wherein the processor is configured to execute instructions to: (i) determine whether a force of engagement between the tip of the training PETDD and the touch sensitive surface is within a predefined range, and (ii) drive the user feedback feature to indicate whether the force of engagement between the tip of the training PETDD and the touch sensitive surface is within the predefined range.

Example 12

The apparatus of any one or more of Examples 1 through 11, The apparatus of claim 1, further comprising a user feedback feature, wherein the processor is configured to execute instructions to: (i) determine whether an angle of engagement between the tip of the training PETDD and the touch sensitive surface is within a predefined range, and (ii) drive the user feedback feature to indicate whether the angle of engagement between the tip of the training PETDD and the touch sensitive surface is within the predefined range.

Example 13

The apparatus of any one or more of Examples 1 through 12, wherein the training PETDD further includes a button, wherein the processor is configured to execute instructions to drive the middle ear display to show a graphical representation of a pressure equalization tube in response to actuation of the button, wherein the location of the graphical representation of a pressure equalization tube is selected based on a location of the tip of the training PETDD at the time the button is actuated.

Example 14

The apparatus of Example 13, further comprising a pin inserted into the handpiece, wherein the button is situated upon the handpiece, and wherein the delivery button is rendered configured to be inoperable until the pin is removed.

Example 15

The apparatus of any one or more of Examples 1 through 14, wherein the middle ear simulating device comprises a smartphone.

Example 16

An apparatus comprising: (a) a training pressure equalization tube delivery device ("PETDD"), the training PETDD comprising: (i) a handpiece, (ii) a cannula extending distally from the handpiece, and (iii) a tip at the distal end of the cannula; (b) an ear model defining an ear canal; (c) a middle ear simulating device coupled with the ear model, the middle ear simulating device comprising: (i) a middle ear display, wherein the middle ear display is configured to show a virtual tympanic membrane, (ii) a touch sensitive surface positioned over the middle ear display, and (iii) a processor in communication with the middle ear display and the touch sensitive surface, wherein the ear model is configured to provide access via the ear canal for the tip of the training PETDD to contact the touch sensitive surface via the ear canal in a region associated with the middle ear display.

Example 17

A method comprising the steps of: (a) displaying a virtual tympanic membrane via a middle ear simulating device; (b) placing an ear model over the middle ear simulating device, the ear model comprising an ear canal opening and an ear canal, so that the virtual tympanic membrane may be viewed through the ear canal; (c) inserting a tip of a training pressure equalization tube delivery device ("PETDD") into the ear canal; (d) pressing the tip of the training PETDD against the virtual tympanic membrane; (e) actuating a button on the training PETDD; and (f) in response to actuation of the simulated button: (i) capturing a set of tip contact location information from a touch sensitive surface of the middle ear simulating device, the set of tip contact location information associated with a present contact between the tip of the training PETDD and the touch sensitive surface, and (ii) capturing a set of tip orientation information and a set of tip contact magnitude information from a sensor, the set of tip orientation information and the set of tip contact magnitude information associated with the magnitude and direction of a force applied by the tip to the touch sensitive surface.

Example 18

The method of Example 17, further comprising the steps of: (a) determining a tip contact location at delivery based on the set of tip contact location information; (b) determining a tip contact magnitude at delivery based on the set of tip contact magnitude information; (c) determining a tip angle at delivery based on the set of tip orientation information, wherein the tip angle is relative to the virtual tympanic membrane; and (d) determining a tip apposition at delivery based on the set of tip orientation information and the set of tip contact magnitude information, wherein the tip apposition is relative to a simulated flexibility of the virtual tympanic membrane.

Example 19

The method of Example 18, further comprising the steps of: (a) comparing the tip contact location at delivery to a set of allowable deployment sites and, where the tip contact location at delivery is not within the set of allowable deployment sites, providing a simulation failure indicator; (b) determining if the tip contact magnitude at delivery falls between a maximum contact magnitude and a minimum contact magnitude and, where the tip contact magnitude at delivery falls outside that range, providing the simulation failure indicator; (c) determining if the tip angle at delivery falls between a maximum angle and a minimum angle and, where the tip angle at delivery falls outside that range, providing the simulation failure indicator; (d) determining if the tip apposition at delivery meets an apposition threshold and, where the tip apposition at delivery does not meet the threshold, providing the simulation failure indicator; and (e) where the simulation failure indicator is not provided, providing a simulation success indicator.

Example 20

The method of Example 19, further comprising the steps of, before actuation of the button: (a) capturing the set of tip contact location information, the set of tip contact magnitude information, and the set of tip orientation information; (b) determining: (i) a pre-delivery tip contact location based on the set of tip contact location information, (ii) a pre-delivery tip contact magnitude at delivery based on the set of tip contact magnitude information, (iii) a pre-delivery tip angle based on the set of tip orientation information, wherein the tip angle is relative to the virtual tympanic membrane, and (iv) a pre-delivery tip apposition based on the set of tip orientation information and the set of tip contact magnitude information, wherein the tip apposition is relative to a simulated flexibility of the virtual tympanic membrane, and (c) generating a feedback signal based upon one or more of the pre-delivery tip contact location, the pre-delivery tip contact magnitude, the pre-delivery tip angle, and the pre-delivery tip apposition.

V. Miscellaneous

It should be understood that any of the examples described herein may include various other features in addition to or in lieu of those described above. By way of example only, any of the devices herein may also include one or more of the various features disclosed in any of the various references that are incorporated by reference herein. It should also be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. An apparatus, comprising:
    an ear model including an ear canal;
    a simulating device including:
        a display configured to display a virtual representation of a tympanic membrane;
        a touch sensitive surface positioned over the display;
        a contact portion configured to engage the ear model; and
        a processor;
    a training device including:
        a handpiece;
        a cannula extending distally from the handpiece; and
        a tip disposed at a distal end of the cannula and insertable through the ear canal of the ear model into contact with the touch sensitive surface.

2. The apparatus of claim 1, wherein the simulating device is configured to provide location information indicating a location on the tympanic membrane associated with a point of contact between the tip and the touch sensitive surface.

3. The apparatus of claim 1, further comprising a sensor configured to measure a magnitude of a force applied by the tip to the touch sensitive surface when the tip is contacting the touch sensitive surface.

4. The apparatus of claim 3, wherein the sensor is integrated into one of the simulating device or the training device.

5. The apparatus of claim 1, further comprising a sensor configured to sense an orientation angle of the tip relative to the touch sensitive surface.

6. The apparatus of claim 5, wherein the sensor is integrated into the training device.

7. The apparatus of claim 1, wherein the training device further includes an actuation element, and the simulating device is configured to generate data in response to an actuation of the actuation element, the data indicating one or more of:
a location on the tympanic membrane associated with a point of contact between the tip and the touch sensitive surface;
a magnitude of a force applied by the tip to the touch sensitive surface; or
an orientation angle of the tip relative to the touch sensitive surface.

8. The apparatus of claim 1, wherein the processor is configured to execute instructions to evaluate a quality of tip apposition based on data indicating one or more of:
a location on the tympanic membrane associated with a point of contact between the tip and the touch sensitive surface;
a magnitude of a force applied by the tip to the touch sensitive surface; or
an orientation angle of the tip relative to the touch sensitive surface.

9. The apparatus of claim 1, further comprising a feedback element, wherein the processor is configured to execute instructions to:
determine that a location on the tympanic membrane associated with a point of contact between the tip and the touch sensitive surface is within a predefined area; and
activate the feedback element in response to determining that the location on the tympanic membrane is within the predefined area to indicate to a user that the location is within the predefined area.

10. The apparatus of claim 1, further comprising a feedback element, wherein the processor is configured to execute instructions to:
determine that a force applied by the tip to the touch sensitive surface when the tip is contacting the touch sensitive surface is within a predefined range, and
activate the feedback element in response to determining that the force is within the predefined range to indicate to a user that the force is within the predefined range.

11. The apparatus of claim 1, further comprising a feedback element, wherein the processor is configured to execute instructions to:
determine that an orientation angle of the tip relative to the touch sensitive surface when the tip is contacting the touch sensitive surface is within a predefined range, and
activate the feedback element in response to determining that the orientation angle is within the predefined range to indicate to a user that the orientation angle is within the predefined range.

12. The apparatus of claim 1, wherein the training device further includes an actuation element, and
the processor is configured to execute instructions to cause the display to display a virtual representation of a pressure equalization tube in response to an actuation of the actuation element at a location on the display relative to the virtual representation of the tympanic membrane based on a location of the tip at a time of the actuation of the actuation element.

13. The apparatus of claim 12, further comprising a pin engageable with the handpiece and configured to prevent the actuation of the handpiece until the pin is disengaged from the handpiece.

14. An apparatus, comprising:
a simulating device including:
a display configured to display a virtual representation of a tympanic membrane;
a touch sensitive surface positioned over the display; and
a processor in communication with the display and the touch sensitive surface;
an ear model including an ear canal configured to receive a portion of a training device such that the portion of the training device can contact a portion of the touch sensitive surface positioned over the virtual representation of the tympanic membrane; and
a sensor disposed within the ear model and configured to measure a depth of insertion of the portion of the training device received in the ear canal.

15. A method, comprising:
inserting a tip of a training device into an ear canal, the training device including a cannula ending in the tip;
engaging the tip of the training device with a touch sensitive surface disposed at a distal end of the ear canal, the touch sensitive surface positioned over a display displaying a virtual representation of a tympanic membrane;
actuating an actuation element; and
in response to the actuation of the actuation element, displaying via the display a virtual representation of a tympanostomy tube at an orientation and a location associated with an engagement between the tip of the training device and the touch sensitive surface.

16. The method of claim 15, further comprising capturing data indicating one or more of:
a magnitude of a force applied by the tip to the touch sensitive surface via the engagement between the tip and the touch sensitive surface; or
an orientation angle of the tip relative to the touch sensitive surface when engaged with the touch sensitive surface.

17. The method of claim 16, further comprising:
if the engagement between the tip and the touch sensitive surface is not within a predefined area, providing a first simulation failure indication;
if the magnitude of the force applied by the tip to the touch sensitive surface is not within a predefined range of magnitudes, providing a second simulation failure indication;
if the orientation angle of the tip relative to the touch sensitive surface is not within a predefined range of orientation angles, providing a third simulation failure indication; and
if (i) the engagement between the tip and the touch sensitive surface is within the predefined area, (ii) the magnitude of the force applied by the tip to the touch sensitive surface is within the predefined range of magnitudes, and (iii) the orientation angle of the tip relative to the touch sensitive surface is within the predefined range of orientation angles, providing a simulation success indication.

18. The method of claim 15, further comprising capturing, using a sensor disposed in the ear model, data indicating a depth of insertion of the tip into the ear canal.

19. The apparatus of claim 1, further comprising a sensor disposed within the ear model and configured to measure a depth of insertion of the tip of the training device into the ear canal.

20. The apparatus of claim 1, wherein the contact portion includes a raised bezel configured to elevate the ear model relative to the touch sensitive surface such that the ear model does not contact the touch sensitive surface.

* * * * *